US012224136B2

(12) United States Patent
Johansson et al.

(10) Patent No.: US 12,224,136 B2
(45) Date of Patent: Feb. 11, 2025

(54) SWITCHING DEVICE

(71) Applicant: ABB Schweiz AG, Baden (CH)

(72) Inventors: Gunnar Johansson, Västerås (SE); Lisa Almén, Västerås (SE)

(73) Assignee: ABB Schweiz AG, Baden (CH)

( * ) Notice: Subject to any disclaimer, the term of this patent is extended or adjusted under 35 U.S.C. 154(b) by 133 days.

(21) Appl. No.: 17/905,517

(22) PCT Filed: Feb. 4, 2021

(86) PCT No.: PCT/EP2021/052623

§ 371 (c)(1),
(2) Date: Sep. 2, 2022

(87) PCT Pub. No.: WO2021/175534

PCT Pub. Date: Sep. 10, 2021

(65) Prior Publication Data

US 2023/0123517 A1 Apr. 20, 2023

(30) Foreign Application Priority Data

Mar. 5, 2020 (EP) .................................... 20161258

(51) Int. Cl.
*H01H 33/18* (2006.01)

(52) U.S. Cl.
CPC ................................ *H01H 33/185* (2013.01)

(58) Field of Classification Search
CPC ...... H01H 33/185; H01H 33/123; H01H 1/20; H01H 3/40; H01H 9/34; H01H 9/446;
(Continued)

(56) References Cited

U.S. PATENT DOCUMENTS 2,953,666 A 9/1960 Matthias
3,560,683 A 2/1971 Maier et al.
(Continued)

FOREIGN PATENT DOCUMENTS

CN 104520953 A 4/2015
CN 108140499 A 6/2018
(Continued)

OTHER PUBLICATIONS

Chinese Office Action and Translation; Application No. 202180015020.4; Completed: Jan. 31, 2023; 9 Pages.
(Continued)

*Primary Examiner* — William A Bolton
(74) *Attorney, Agent, or Firm* — Whitmyer IP Group LLC

(57) ABSTRACT

An electromechanical switching device for breaking an electric current, the switching device including a stationary main contact; a movable main contact; a stationary arcing contact; a movable arcing contact, the stationary arcing contact and the movable arcing contact being arranged in parallel with the stationary main contact and the movable main contact; an actuating arrangement configured to move the movable main contact and the movable arcing contact; and a magnetic member arranged to generate a magnetic holding force in response to an electric current flow through the movable arcing contact when the movable arcing contact is in the closed position, the magnetic holding force acting on the movable arcing contact in a direction against the stationary arcing contact.

15 Claims, 5 Drawing Sheets

(58) Field of Classification Search

CPC ............ H01H 9/38; H01H 9/40; H01H 9/383; H01H 77/108; H01H 9/346

USPC ............... 218/30, 31, 23, 26, 18, 21; 335/16

See application file for complete search history.

(56) References Cited

U.S. PATENT DOCUMENTS

| | | | | |
|---|---|---|---|---|
| 4,039,983 | A | 8/1977 | Terracol et al. | |
| 4,408,173 | A * | 10/1983 | Adlerteg | H01H 77/10<br>335/16 |
| 7,716,816 | B2 * | 5/2010 | Annis | H01H 9/446<br>218/27 |
| 10,347,436 | B2 * | 7/2019 | Johansson | H01H 9/38 |
| 2001/0015879 | A1 * | 8/2001 | Benard | H01H 9/42<br>361/13 |
| 2008/0074216 | A1 | 3/2008 | Annis et al. | |
| 2013/0105444 | A1 * | 5/2013 | Prohaska | H01H 9/443<br>218/26 |
| 2013/0154775 | A1 | 6/2013 | Choi | |
| 2014/0002215 | A1 * | 1/2014 | Ionescu | H01H 50/18<br>335/18 |
| 2016/0056000 | A1 * | 2/2016 | Ozkaya | H01H 1/2041<br>218/23 |

FOREIGN PATENT DOCUMENTS

| | | | |
|---|---|---|---|
| WO | 2014004967 | A1 | 1/2014 |
| WO | 2017059910 | A1 | 4/2017 |
| WO | 2017059912 | A1 | 4/2017 |

OTHER PUBLICATIONS

Chinese Rejection; Application No. 202180015020.4; Completed Jun. 30, 2023; 11 Pages.

International Search Report and Written Opinion of the International Searching Authority; Application No. PCT/EP2021/052623; Completed: Mar. 26, 2021; Mailing Date: Apr. 6, 2021; 14 Pages.

Indian Office Action: Application No. 202247039472; Completed: Nov. 16, 2022; 5 Pages.

International Preliminary Report on Patentability and Written Opinion of the International Searching Authority; Application No. PCT/EP2021/052623; Completed: Sep. 6, 2022; Mailing Date: Sep. 15, 2022; 8 Pages.

* cited by examiner

SWITCHING DEVICE

TECHNICAL FIELD

The present disclosure generally relates to an electromechanical switching device. In particular, an electromechanical switching device for breaking an electric current, which switching device comprises a magnetic member, is provided.

BACKGROUND

Switching devices are used for making, breaking, and carrying an electric current. An electromechanical switching device may comprise contacts including a stationary contact and a movable contact, which during normal operation are in mechanical and electrical connection. When the contacts are separated from each other, a current breaking operation is effected. In addition to separating the contacts, a current breaking/interrupting operation involves extinguishing an arc between the contacts, and forcing the current to decrease to zero.

So-called parallel make-and-break switching devices are previously known. Such switching devices comprise a main contact pair including a movable main contact and a stationary main contact and an arcing contact pair including a movable arcing contact and a stationary arcing contact coupled in parallel with the main contact pair. The electric current is commutated from the main contacts to the arcing contacts prior to breaking the current. Different characteristics that are required for different modes of operations are thus optimized. In such switching devices, the main contacts normally only conduct the current and are not involved in the switching operations that create arcs. The material in the main contacts is optimized for good conductivity thus reducing the generated power when current is flowing. On the other hand, the arcing contacts are arranged to handle breaking operations and are not meant for continuously conducting the current.

WO 2017059910 A1 discloses a switching device for breaking an electric current. The switching device comprises a main contact carrier, a movable main contact and a stationary main contact, wherein the movable main contact is attached to the main contact carrier. The switching device further comprises an arcing contact carrier, a movable arcing contact and a stationary arcing contact, wherein the movable arcing contact is attached to the arcing contact carrier and the stationary arcing contact is arranged in parallel with the stationary main contact. The switching device further comprises an actuating unit for actuating the main and arcing contact carriers from an open position to a close position or vice versa. The switching device further comprises a first rack and a first gear for actuating the arcing contact carrier so that, when interrupting the current, a separation distance between the arcing contacts is longer than a separation distance between the main contacts.

WO 2017059912 A1 discloses a switching device comprising a stationary main contact, a movable main contact, a stationary arcing contact and a movable arcing contact. The stationary arcing contact is arranged in parallel with the stationary main contact. US 2008074216 A1 discloses a contactor assembly comprising carry contacts, a carry contact bridge, arc contacts and an arc contact bridge. The arc contact bridge and the carry contact bridge are moveable in a direction such that opposing ends of the arc contact bridge engage the arc contacts of stationary contacts and opposing ends of the carry contact bridge engage adjacent carry contacts of the stationary contacts. The contactor assembly further comprises an arc arrestor and a magnetic intensifier. The magnetic intensifier increases the magnitude of a magnetic force toward the arc arrestor and ensures expedient transfer of the arc from the stationary arc contact to plates of arc arrestor.

U.S. Pat. No. 2,953,666 A discloses a circuit interrupting switch comprising two stationary conductors, a bridging contact member and an actuator arranged to move the bridging contact member. The stationary conductor comprises a downwardly facing stationary contact and the stationary conductor comprises a downwardly facing stationary contact. Each contact is in vertical alignment with a bridging contact on the bridging contact member.

In an electromechanical switching device comprising main contacts and arcing contacts arranged in parallel, the electric current through the arcing contacts generates a separation force on the arcing contacts. If the current through the arcing contacts is high, the separation force on the arcing contacts is consequently also high. For high currents, there is a risk that the commutation fails due to the high separation forces. If this happens, the arcing may occur at the main contacts and result in a failed current breaking.

The contact force between the arcing contacts provided by the actuating arrangement may not always be sufficient for overcoming the separation forces and maintaining the arcing contacts in contact after commutation from the main contacts to the arcing contacts and prior to breaking the current. Thus, it may not be possible to break high currents. This may be addressed by increasing the rating of the actuating arrangement, i.e. to make the actuating arrangement more powerful. However, this increases forces and wear, and consequentially also cost, weight and complexity, of the switching device.

SUMMARY

One object of the present disclosure is to provide an electromechanical switching device for breaking an electric current, which switching device improves electric current breaking.

A further object of the present disclosure is to provide an electromechanical switching device for breaking an electric current, which switching device improves commutation from main contacts to arcing contacts.

A still further object of the present disclosure is to provide an electromechanical switching device for breaking an electric current, which switching device has a cost-effective design.

A still further object of the present disclosure is to provide an electromechanical switching device for breaking an electric current, which switching device solves several or all of the foregoing objects in combination.

According to one aspect, there is provided an electromechanical switching device for breaking an electric current, the switching device comprising a stationary main contact; a movable main contact; a stationary arcing contact; a movable arcing contact, the stationary arcing contact and the movable arcing contact being arranged in parallel with the stationary main contact and the movable main contact; an actuating arrangement configured to move the movable main contact relative to the stationary main contact between a closed position, in contact with the stationary main contact, and an open position, separated from the stationary main contact, and configured to move the movable arcing contact linearly relative to the stationary arcing contact between a closed position, in contact with the stationary arcing contact, and an open position, separated from the stationary arcing contact; and a magnetic member arranged to generate a magnetic holding force in response to an electric current flow through the movable arcing contact when the movable arcing contact is in the closed position, the magnetic holding force acting on the movable arcing contact in a direction against the stationary arcing contact.

The switching device is configured to initially move the movable main contact from the closed position towards the open position while the movable arcing contact is maintained in the closed position in contact with the stationary arcing contact. The current previously passing through the main contacts is thereby moved to pass through the arcing contacts. The switching device is thus configured to commute the current from the main contacts to the arcing contacts prior to breaking the current.

Due to the current passing through the arcing contacts, a separation force is induced by the current. However, the current passing through the arcing contacts also generates a magnetic field due to the magnetic member. By means of this magnetic field, the movable arcing contact is forced against the stationary arcing contact, for example by magnetic attraction. The magnetic member is thus configured to generate a magnetic holding force in response to the current flow that provides a contact force between the arcing contacts that counteracts the separation force. When breaking high currents, the magnetic holding force will consequentially also be high. In this way, the magnetic holding force will counteract the separation forces at a wide range of currents. A consequential arcing between the main contacts can therefore be avoided. The current can thus be reliably commutated from the main contacts to the arcing contacts. After this commutation, the movable arcing contact is opened to extinguish the arc between the arcing contacts, e.g. by means of splitter plates. In this way, commutation from the main contacts to the arcing contacts is improved. Moreover, the magnetic member increases the current withstand of the movable arcing contact.

When the movable main contact adopts the closed position, the movable main contact is in mechanical and electrical connection with the stationary main contact. When the movable arcing contact adopts the closed position, the movable arcing contact is in mechanical and electrical connection with the stationary arcing contact. When the movable main contact and the movable arcing contact adopt their respective open positions, a distance between the movable arcing contact and the stationary arcing contact may be larger than a distance between the movable main contact and the stationary main contact.

The closed position and the open position of the movable main contact may be referred to as a first closed position and a first open position, respectively. The closed position and the open position of the movable arcing contact may be referred to as a second closed position and a second open position, respectively.

The magnetic member may be a magnetic core. The switching device may further comprise a magnetic armature fixed directly or indirectly to the movable arcing contact.

The magnetic member may be of a material having positive magnetic susceptibility. The magnetic member thereby enhances the magnetic field. The magnetic member may for example be made of magnetic metal, such as magnetic iron.

The magnetic member may be stationary. In this way, the magnetic holding force can be generated independently of the forces provided by the actuating arrangement.

The magnetic member may be a rigid piece. The magnetic member may be integrally formed from a single material.

The switching device may further comprise an arcing contact carrier carrying the movable arcing contact. The arcing contact carrier may comprise, or be constituted by, a magnetic armature.

The actuating arrangement may be configured to drive the arcing contact carrier such that the movable arcing contact moves from the closed position to the open position. The movable arcing contact may be fixedly attached to the arcing contact carrier. The arcing contact carrier may be an arm.

The switching device may further comprise a main contact carrier carrying the movable main contact. The actuating arrangement may be configured to drive the main contact carrier such that the movable main contact moves from the closed position to the open position. The movable main contact may be fixedly attached to the main contact carrier. The main contact carrier may be an arm.

The magnetic member may be U-shaped or V-shaped. In this case, the arcing contact carrier may be received in the magnetic member when the movable arcing contact adopts the closed position.

The magnetic member may partly enclose the arcing contact carrier when the movable arcing contact is in the closed position. The magnetic member may be positioned such that the movable arcing contact moves away from the magnetic member when moving from the closed position to the open position. The magnetic member may for example be positioned below the arcing contact carrier.

The actuating arrangement may be configured to move the movable arcing contact away from the stationary arcing contact at a first speed, and configured to move the movable main contact away from the stationary main contact at a second speed, lower than the first speed.

The actuating arrangement may comprise an actuator and a transmission. In this case, the movable main contact may be driven by the actuator, and the movable arcing contact may be driven by the actuator via the transmission.

The transmission may comprise a rack and pinion mechanism. According to one example, the transmission comprises a first support member driven by the actuator, a first gear rack fixed to the first support member, a first gear wheel arranged to mesh with the first gear rack, a second gear wheel, larger than the first gear wheel and fixed to the first gear wheel, a second gear rack arranged to mesh with the second gear wheel, and a second support member fixed to the second gear rack. In this example, one or more movable main contacts may be fixed to the first support member and one or more movable arcing contacts may be fixed to the second support member.

The movable main contact may be driven directly by the actuator.

The transmission may be a speed increasing transmission. The transmission may for example have a ratio of between 1:2 and 1:8, such as 1:4. In this variant, the magnetic member is particularly advantageous since a separation force acting on the movable arcing contact will be multiplied with the transmission ratio when this separation force is related to the actuator.

The actuating arrangement may be arranged to move the movable main contact linearly relative to the stationary main contact between the closed position and the open position.

The switching device may be configured to break an electric current with two contact pairs in series. In this case, the actuating arrangement may be provided between the two contact pairs.

The switching device may comprise a primary stationary main contact, a primary movable main contact, a secondary stationary main contact, and a secondary movable main contact. In this case, each of the primary stationary main contact and the secondary stationary main contact may be a stationary main contact as described herein, and each of the primary movable main contact and the secondary movable main contact may be a movable main contact as described herein. The actuating arrangement may be provided between the primary main contact pair and the secondary main contact pair. The primary movable main contact and the secondary movable main contact may be driven in common by the actuating arrangement, for example by being connected to a common main contact carrier.

Alternatively, or in addition, the switching device may comprise a primary stationary arcing contact, a primary movable arcing contact, a secondary stationary arcing contact and a secondary movable arcing contact. In this case, each of the primary stationary arcing contact and the secondary stationary arcing contact may be a stationary arcing contact as described herein, and each of the primary movable arcing contact and the secondary movable arcing contact may be a movable arcing contact as described herein. The actuating arrangement may be provided between the primary arcing contact pair and the secondary arcing contact pair. The primary movable arcing contact and the secondary movable arcing contact may be driven in common by the actuating arrangement, for example by being connected to a common arcing contact carrier.

The switching device may be a contactor.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
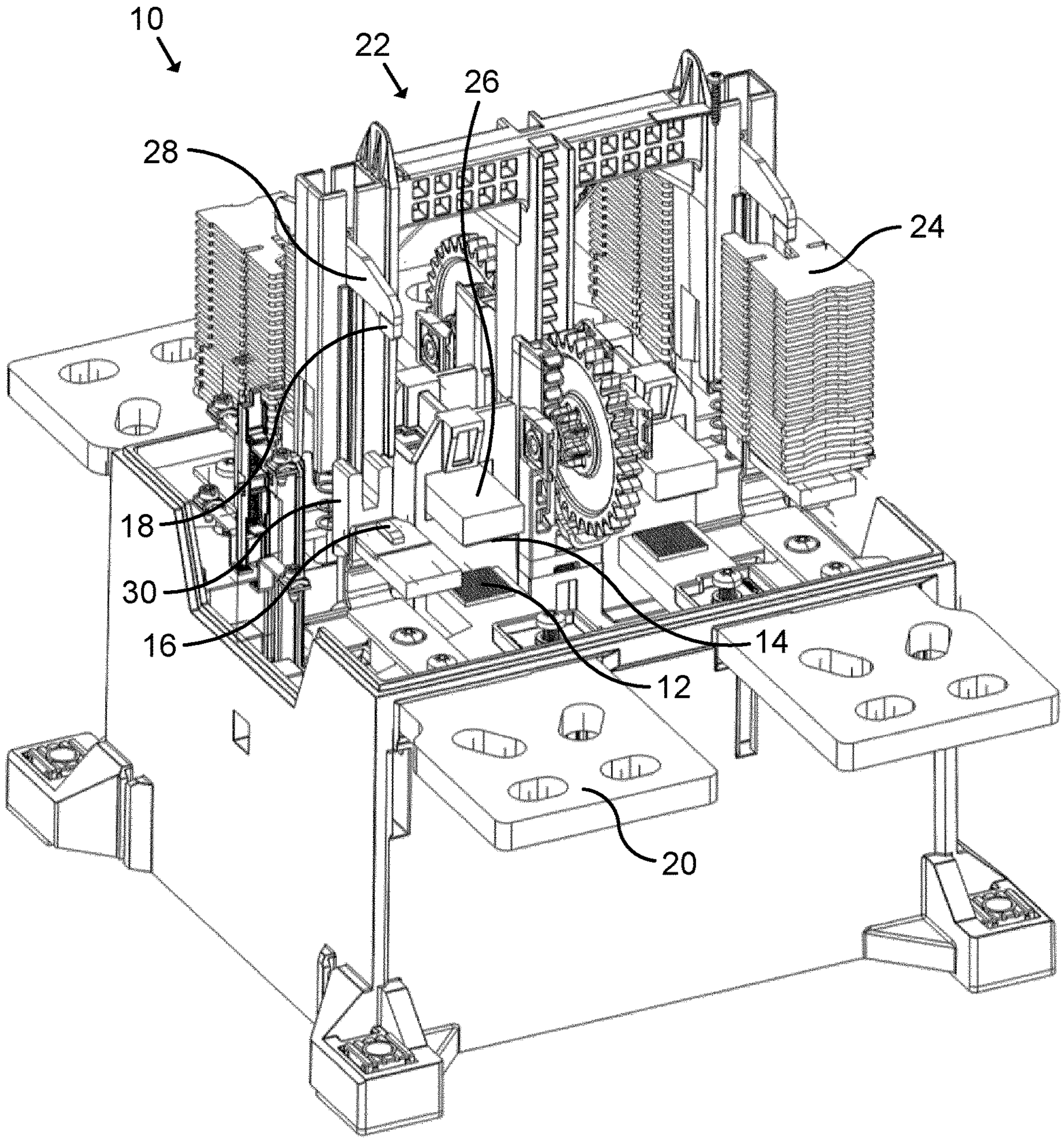
FIG. 1: schematically represents a perspective view of an electromechanical switching device.

In the following, an electromechanical switching device for breaking an electric current, which switching device comprises a magnetic member, will be described. The same or similar reference numerals will be used to denote the same or similar structural features.

FIG. 1 schematically represents a partial perspective view of an electromechanical switching device 10. The switching device 10 is configured to break an electric current. In this example, the switching device 10 is a contactor. In FIG. 1, some parts of the switching device 10 are removed to increase visibility.

Figure 2:
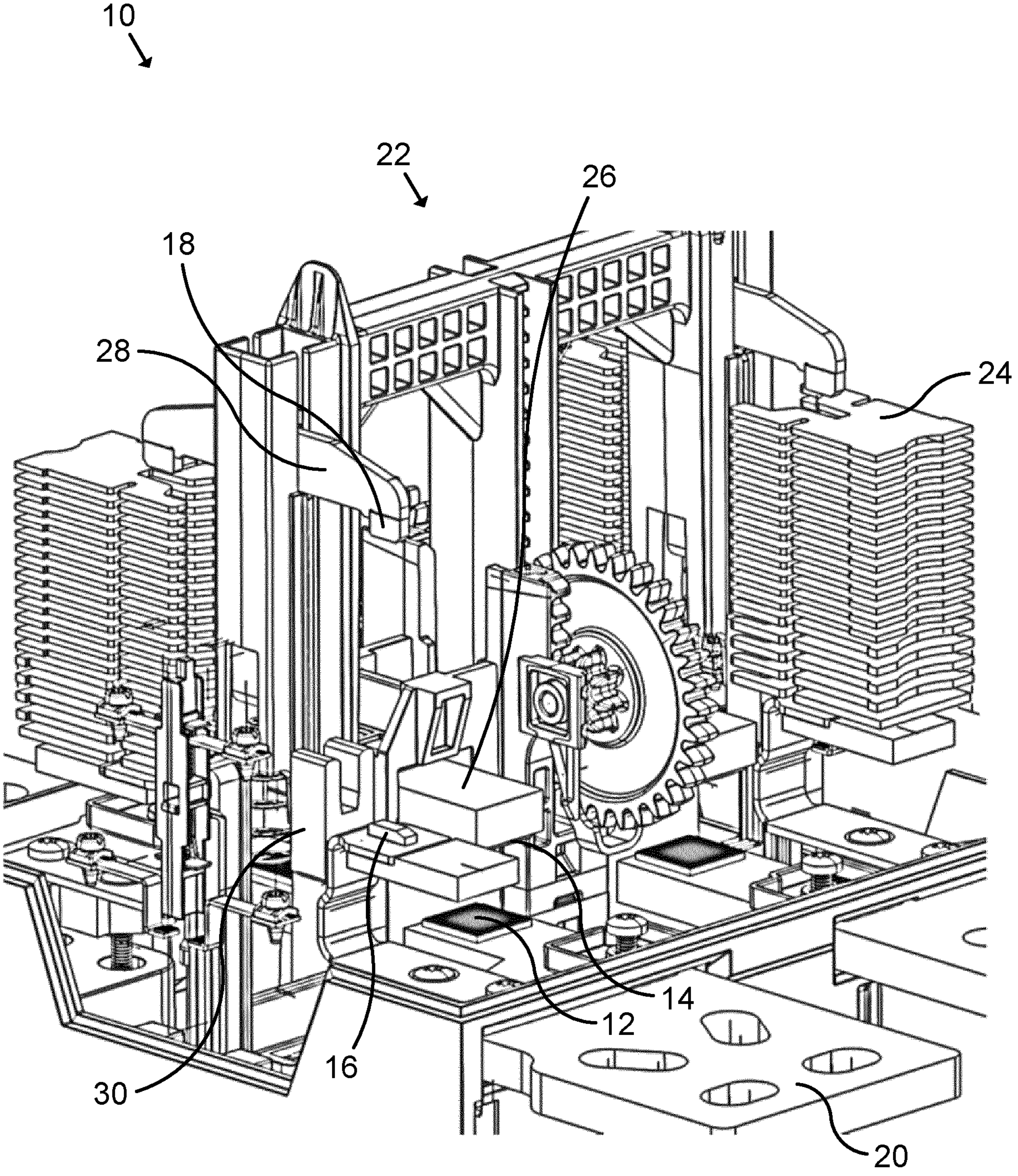
FIG. 2: schematically represents a partial perspective view of the switching device.

FIG. 2 schematically represents a partial perspective view of the switching device 10. Also in FIG. 2, some parts of the switching device 10 are removed to increase visibility. With collective reference to FIGS. 1 and 2, the switching device 10 comprises a stationary main contact 12, a movable main contact 14, a stationary arcing contact 16 and a movable arcing contact 18. The switching device 10 further comprises switching bars 20 for connection of the switching device 10 to an external main electric circuit (not shown).

The stationary main contact 12 and the movable main contact 14 form a main contact pair. The stationary arcing contact 16 and the movable arcing contact 18 form an arcing contact pair. The main contact pair is arranged in parallel with the arcing contact pair.

The switching device 10 further comprises an actuating arrangement 22. The actuating arrangement 22 is configured to move the movable main contact 14 relative to the stationary main contact 12 between a closed position and an open position. In the closed position, the movable main contact 14 is in mechanical and electrical contact with the stationary main contact 12. In the open position, the movable main contact 14 is separated from the stationary main contact 12. In FIGS. 1 and 2, the movable main contact 14 is in the open position.

The actuating arrangement 22 is further configured to move the movable arcing contact 18 linearly relative to the stationary arcing contact 16 between a closed position and an open position. In this example, the movable arcing contact 18 is arranged to move linearly in a vertical direction. In the closed position, the movable arcing contact 18 is in mechanical and electrical contact with the stationary arcing contact 16. In the open position, the movable arcing contact 18 is separated from the stationary arcing contact 16. In FIGS. 1 and 2, the movable arcing contact 18 is in the open position.

In the example in FIGS. 1 and 2, the switching device 10 comprises four main contact pairs and four arcing contact pairs. In the illustration in FIGS. 1 and 2, three of the arcing contact pairs are covered by a respective stack of splitter plates 24.

The switching device 10 of this example further comprises two main contact carriers 26 and two arcing contact carriers 28. Each of the main contact carriers 26 and the arcing contact carriers 28 is here exemplified as an arm. On each main contact carrier 26, a movable main contact 14 is fixedly attached on each side of the actuating arrangement 22. On each arcing contact carrier 28, a movable arcing contact 18 is fixedly attached on each side of the actuating arrangement 22.

Thus, two arcing contact pairs are provided on a front side of the actuating arrangement 22 and two arcing contact pairs are provided on a rear side of the actuating arrangement 22. Moreover, two main contact pairs are provided on the front side of the actuating arrangement 22, between the two front arcing contact pairs, and two-front main contact pairs are provided on the rear side of the actuating arrangement 22, between the two rear arcing contact pairs. The switching device 10 thus comprises a first set of two main contact pairs in series, a second set of two main contact pairs in series, a third set of two arcing contact pairs in series, and a fourth set of two arcing contact pairs in series.

Each main contact pair is responsible for carrying/conducting a current. Each arcing contact pair is responsible for experiencing arcs occurring during a switching operation that may be either a closing or an opening operation.

The switching device 10 further comprises a magnetic member 30. The magnetic member 30 is stationary and of a material having positive magnetic susceptibility, such as magnetic iron. The magnetic member 30 is thus a magnetic core. In this example, each arcing contact carrier 28 is magnetically effected by the magnetic member 30.

As shown in FIGS. 1 and 2, the magnetic member 30 of this example is a rigid U-shaped piece formed from a single piece of material. When the movable arcing contact 18 adopts the closed position, the magnetic member 30 is arranged to generate a magnetic holding force in response to a current flow through the movable arcing contact 18, as detailed below.

In the example in FIGS. 1 and 2, the switching device 10 comprises four magnetic members 30. Each magnetic member 30 is associated with a movable arcing contact 18. Two magnetic members 30 are arranged on the front side of the actuating arrangement 22 and two magnetic members 30 are arranged on the rear side of the actuating arrangement 22. Each magnetic member 30 is positioned below one of the arcing contact carriers 28.

Figure 3:
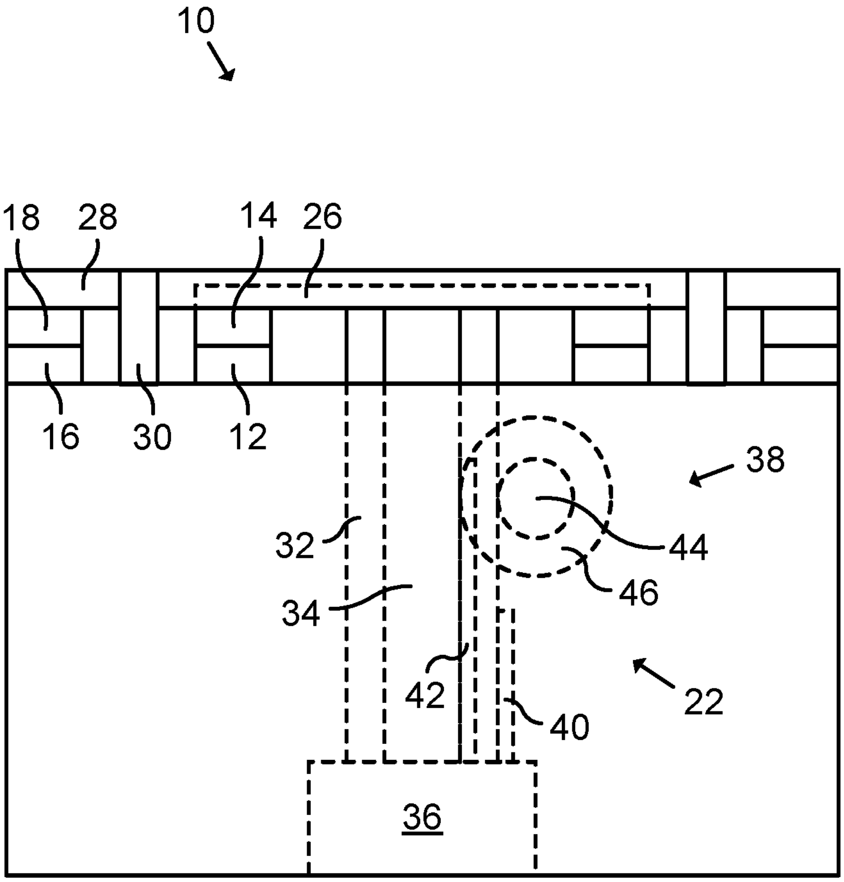
FIG. 3: schematically represents a movable main contact in a closed position and a movable arcing contact in a closed position.

FIG. 3 represent a more schematic illustration of the switching device 10. In FIG. 3, the movable main contact 14 is in the closed position and the movable arcing contact 18 is in the closed position. In the closed position of the movable main contact 14, the movable main contact 14 is in mechanical and electrical connection with the associated stationary main contact 12. In the closed position of the movable arcing contact 18, the movable arcing contact 18 is in mechanical and electrical connection with the stationary arcing contact 16.

Moreover, in the closed position of the movable arcing contact 18 according to FIG. 3, the arcing contact carrier 28 is snugly received in the U-shaped magnetic member 30. The magnetic member 30 thereby partly encloses the arcing contact carrier 28.

The switching device 10 further comprises a first support member 32 and a second support member 34. The first support member 32 is fixed to the main contact carrier 26. The second support member 34 is fixed to the arcing contact carrier 28.

As shown in FIG. 3, the actuating arrangement 22 comprises an actuator 36 and a transmission 38. The first support member 32 is arranged to be driven directly by the actuator 36, i.e. without any intermediate transmission. The second support member 34 is arranged to be driven by the actuator 36 via the transmission 38. The transmission 38 of this example is a speed increasing transmission having a ratio of 1:4.

The transmission 38 of this specific example comprises a first gear rack 40, a second gear rack 42, a first gear wheel 44 and a second gear wheel 46. The first gear rack 40 is fixed to the first support member 32. The second gear rack 42 is fixed to the second support member 34. Each of the first gear rack 40 and the second gear rack 42 is vertically oriented. The first gear wheel 44 is smaller than the second gear wheel 46. The first gear wheel 44 is fixed to the second gear wheel 46 for common rotation about a horizontal rotation axis (not denoted).

In the following, a current breaking operation of the switching device 10 will be described. Although the description is given for two contact pairs, it should be understood that the described breaking operation also takes place for each of the remaining contact pairs.

Figure 4:
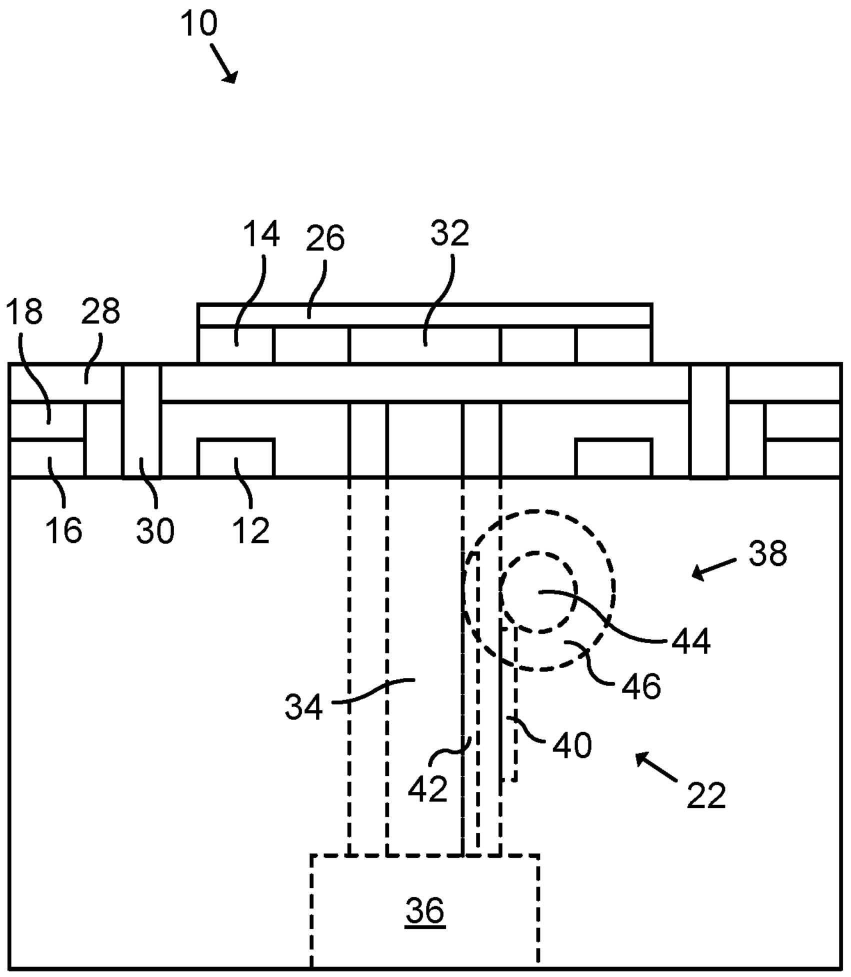
FIG. 4: schematically represents the movable main contact in an open position and the movable arcing contact in the closed position.

FIG. 4 schematically represents the movable main contact 14 in an open position and the movable arcing contact 18 in the closed position. During a breaking operation, the actuator 36 drives the first support member 32 vertically upwards. Thereby, the main contact carrier 26 is moved vertically upwards such that the movable main contact 14 moves linearly away from the closed position and separates from the stationary main contact 12.

Only at the very end of this initial movement of the first support member 32, the first gear rack 40 moves into meshing engagement with the first gear wheel 44. Therefore, this initial movement of the first support member 32 is not transmitted to any movement of the second support member 34.

In FIG. 4, instead of flowing through the main contact pair, the current now flows through the arcing contact pair. The current flow through the arcing contact pair generates a separation force. The separation force acts to separate the movable arcing contact 18 from the stationary arcing contact 16. The magnitude of this separation force is dependent on the magnitude of the current.

However, at the same time, the magnetic member 30 generates a magnetic holding force in response to the current flow through the movable arcing contact 18. Since the magnetic member 30 is stationary, the magnetic holding force is generated independently of the kinematics of the actuating arrangement 22. In this example, when the current passes through the movable arcing contact 18, a magnetic circuit comprising the magnetic member 30 and the arcing contact carrier 28 is magnetized, whereby the magnetic holding force arises between the magnetic member 30 and the arcing contact carrier 28. This magnetic holding force acts on the movable arcing contact 18 in a direction against the stationary arcing contact 16, i.e. pressing downwards in FIG. 4. Also the magnitude of the magnetic holding force is dependent on the magnitude of the current.

The magnetic holding force thus reduces or eliminates the effect of the separation force. A balancing effect is thereby generated. The magnetic holding force is particularly advantageous for this particular switching device 10 in the state in FIG. 4 since the actuating arrangement 22 can only provide a reduced downward pressing force of the movable arcing contact 18 against the stationary arcing contact 16 due to the transmission 38.

Figure 5:
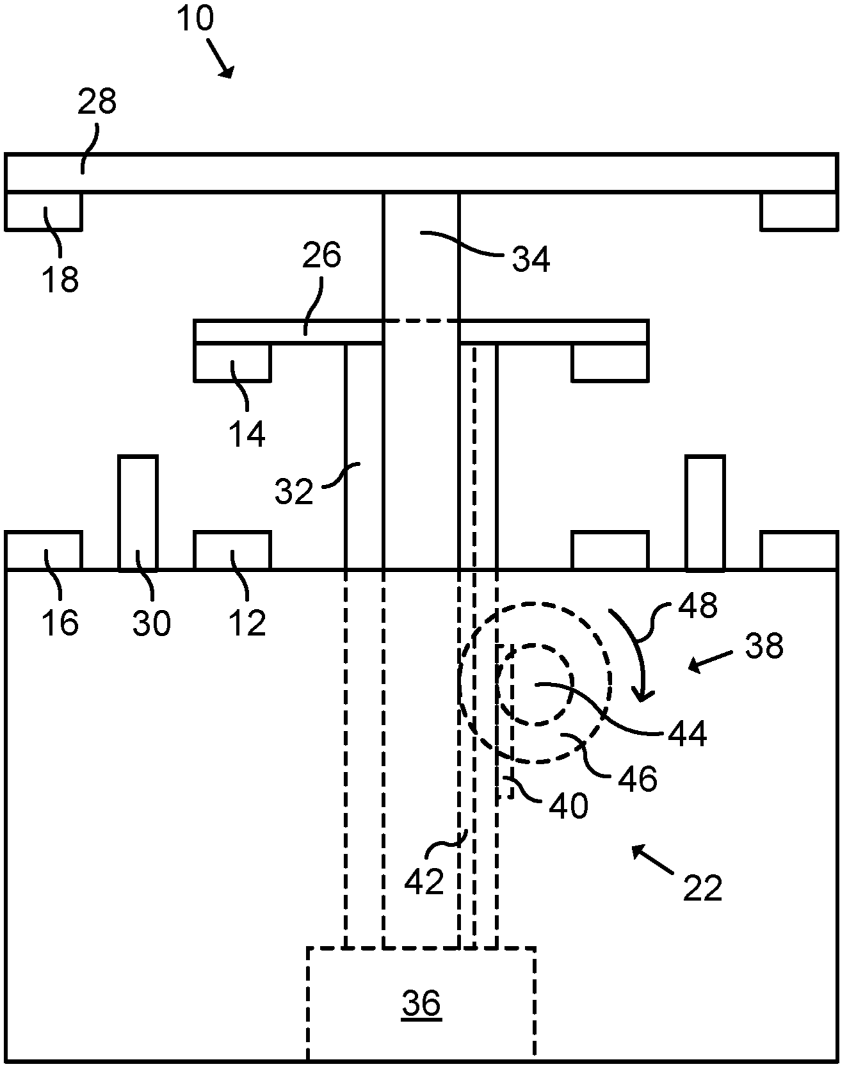
FIG. 5: schematically represents the movable main contact in the open position and the movable arcing contact in an open position.

FIG. 5 schematically represents the movable main contact 14 in a further open position and the movable arcing contact 18 in an open position. As the first support member 32 is driven further (from the FIG. 4 position) by means of the actuator 36, the meshing between the first gear rack 40 and the first gear wheel 44 causes the first gear wheel 44 and the second gear wheel 46 to rotate in common, as illustrated by arrow 48. Since the second gear wheel 46 meshes with the second gear rack 42, the second support member 34 and the arcing contact carrier 28 are driven vertically upwards. The movable arcing contact 18 thereby moves linearly from the closed position in FIG. 4 to the open position in FIG. 5. The electric arc between the movable arcing contact 18 and the stationary arcing contact 16 is extinguished by the splitter plates 24.

As can be gathered from FIGS. 4 and 5, the movable arcing contact 18 moves faster than the movable main contact 14. In the state of the switching device 10 in FIG. 5, the distance between the movable arcing contact 18 and the stationary arcing contact 16 is larger than the distance between the movable main contact 14 and the stationary main contact 12.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. An electromechanical switching device for breaking an electric current, the switching device comprising:
- a stationary main contact;
- a movable main contact;
- a stationary arcing contact;
- a movable arcing contact, the stationary arcing contact and the movable arcing contact being arranged in parallel with the stationary main contact and the movable main contact;
- an actuating arrangement configured to move the movable main contact relative to the stationary main contact between a closed position, in contact with the stationary main contact, and an open position, separated from the stationary main contact, and configured to move the movable arcing contact linearly relative to the stationary arcing contact between a closed position, in contact with the stationary arcing contact, and an open position, separated from the stationary arcing contact; and
- a magnetic member arranged to generate a magnetic holding force in response to an electric current flow through the movable arcing contact when the movable arcing contact is in the closed position, the magnetic holding force acting on the movable arcing contact in a direction against the stationary arcing contact.

2. The switching device according to claim 1, wherein the magnetic member is of a material having positive magnetic susceptibility.

3. The switching device according to claim 1, wherein the magnetic member is stationary.

4. The switching device according to claim 1, wherein the magnetic member is a rigid piece.

5. The switching device according to claim 1, further comprising an arcing contact carrier carrying the movable arcing contact.

6. The switching device according to claim 5, wherein the arcing contact carrier is an arm.

7. The switching device according to claim 1, wherein the magnetic member is U-shaped or V-shaped.

8. The switching device according to claim 6, wherein the magnetic member partly encloses the arcing contact carrier when the movable arcing contact is in the closed position.

9. The switching device according to claim 1, wherein the actuating arrangement comprises an actuator and a transmission, wherein the movable main contact is driven by the actuator, and wherein the movable arcing contact is driven by the actuator via the transmission.

10. The switching device according to claim 9, wherein the movable main contact is driven directly by the actuator.

11. The switching device according to claim 9, wherein the transmission is a speed increasing transmission.

12. The switching device according to claim 1, wherein the actuating arrangement is arranged to move the movable main contact linearly relative to the stationary main contact between the closed position and the open position.

13. The switching device according to claim 1, wherein the switching device is configured to break an electric current with two contact pairs in series.

14. The switching device according to claim 1, wherein the switching device is a contactor.

15. The switching device according to claim 1, wherein the actuating arrangement is configured to move the movable arcing contact away from the stationary arcing contact at a first speed, and configured to move the movable main contact away from the stationary main contact at a second speed, lower than the first speed.

* * * * *